United States Patent [19]

Wakahara

[11] Patent Number: 4,905,212
[45] Date of Patent: Feb. 27, 1990

[54] TIMER SETTING APPARATUS FOR A VIDEO TAPE RECORDER

[75] Inventor: Tatsuya Wakahara, Tokyo, Japan

[73] Assignee: Sony Corporation, Tokyo, Japan

[21] Appl. No.: 273,138

[22] Filed: Nov. 18, 1988

Related U.S. Application Data

[63] Continuation of Ser. No. 63,525, Jun. 18, 1987, abandoned.

[30] Foreign Application Priority Data

Jun. 19, 1986 [JP] Japan .................. 61-144337

[51] Int. Cl.⁴ .......................................... G04B 47/00
[52] U.S. Cl. ........................................ 368/10; 368/28; 455/181; 455/186
[58] Field of Search .......... 358/335; 360/33.1, 69; 364/569; 368/10, 28; 455/171, 179, 181, 185, 186

[56] References Cited

U.S. PATENT DOCUMENTS

| | | | |
|---|---|---|---|
| 4,004,085 | 1/1977 | Makino et al. | 340/324 AD |
| 4,193,120 | 3/1980 | Yello | 358/335 |
| 4,325,081 | 4/1982 | Abe et al. | 455/171 |
| 4,435,842 | 3/1984 | Mayumi et al. | 455/186 |
| 4,475,153 | 10/1984 | Kihara et al. | 364/569 |
| 4,626,909 | 12/1986 | Oniki et al. | 455/181 |
| 4,641,205 | 2/1987 | Beyers | 360/33.1 |
| 4,706,121 | 11/1987 | Young | 455/181 |
| 4,718,112 | 1/1988 | Shinado | 360/33.1 |
| 4,786,982 | 11/1988 | Wakahara et al. | 360/33.1 |

FOREIGN PATENT DOCUMENTS

| | | |
|---|---|---|
| 191149 | 11/1985 | European Pat. Off. |
| 0188162 | 12/1985 | European Pat. Off. |
| 1473634 | 5/1977 | United Kingdom |
| 2044446 | 10/1980 | United Kingdom |
| 2155713 | 3/1985 | United Kingdom |

OTHER PUBLICATIONS

Instruction Manual for Kodak MVS-380 VCR System, pp. 11 and 47.
Pp. 436-441 of IEEE Transactions of Consumer Electronics, vol. CE-24 No. 3, Aug. 1978, "Microprocessor Based Software Defined Television Controller".

Primary Examiner—Patrick R. Salce
Assistant Examiner—Jeffrey Sterrett
Attorney, Agent, or Firm—Hill, Van Santen, Steadman & Simpson

[57] ABSTRACT

A timer setting apparatus for a video tape recorder for setting the timer control data including the date data, the day data, the starting time data, the ending time data, and the input signal selecting data, so as to actuate electronic equipment such as a VTR such that the electronic equipment will properly operate at the proper time on the set date. The timer setting apparatus comprises a timer control circuit which provides timer setting information according to signals supplied thereto from a switch circuit which is operating for setting the timer and desired modes and display means which displays all of the possible choices of items to be registered for setting the timer to facilitate the timer setting operation.

4 Claims, 8 Drawing Sheets

FIG.16

```
1       1-WED    9/18    βII
     PM 7:00  —   8:56      8CH
2    EVERY-SUN           βIII
     PM 8:00  —   9:00      1CH
3       3-TUE   10/1    βII  SC
     AM 12:00 —  12:15     6CH
```

TIMER SETTING APPARATUS FOR A VIDEO TAPE RECORDER

This is a continuation of application Ser. No. 063,525, filed June 18, 1987, now abandoned.

BACKGROUND OF THE INVENTION

1. Field of the Invention

The present invention relates to a timer setting apparatus, for example, for use with a video tape recorder, for presetting the time when the VTR will start for video recording.

DESCRIPTION OF THE PRIOR ART

A conventional timer setting apparatus for VTR display timer setting information on the screen 1 of a flat panel (FP) closed display located on the operating panel of the VTR. As shown in FIG. 13, the timer setting information includes, for example, an event number indication 2, a starting date and a time indication 3, a video input signal indication 4, a video recording speed indication 5, and the ending time indication 6. The user can enter data for presetting the timer for future video recording, for example, during a period of three weeks in advance from the date when the timer is set (hereinafter referred to as the presetting date).

As shown in FIG. 13, the starting date indication 3 indicates that video recording is to be started at 7:30 p.m. (P.M. 7:30:) on Wednesday of the first week (:1-WE:), which is the week of the presetting date. The video input signal indication 4 indicates that video signals transmitted from channel 4 ("4 CH") is to be recorded and the video recording speed indication indicates that the video recording speed is II mode ("Beta II"). The ending time indication 6 indicates that video recording is to be ended at 8:30 pm (PM 8:30) and the event number indication 2 indicates that the timer setting information is recorded in the first event ("1") memory of the timer setting apparatus. In FIG. 13, the symbol "*" represents a space.

Such type of indication, however, produces a complicated problem for confirming the contents of the indication. Thus, before presetting a scheduled date, the user must perform a very complicated timer setting operation requiring the confirmation of the number of weeks from the setting day to the schedule date for which the timer is to be set. For example, if the day of the week of the scheduled event is unknown, the user needs to confirm the day of the week on a calendar or to find the day of the week by counting the days in his mind. On the other hand, there is a problem in confronting the scheduled date on the VTR in that it is difficult to find the month of the scheduled event immediately. Also, it is possible when recording a program to be broadcast after 12:00 midnight on Saturday that this timer, which is to be set for the Sunday of the next week, is erroneously set for the Saturday of the current week.

Such problems may be solved by displaying more information to facilitate the recognition of the contents of the indication. However, display capacity of the convention FP display is insufficient and the increase of information requires increased space for indication thus unavoidably requiring the enlargement of the operating panel of the VTR.

SUMMARY OF THE INVENTION

It is an object of the present invention to provide a timer setting apparatus capable of displaying timer setting information in an easily understandable manner for setting the timer.

So as to achieve the object of the invention, the present invention provides a timer setting apparatus capable of simultaneous displaying all of the possible choices, such as day of the week, the date, the starting hour, the ending hour and the input signal to be shown on the display means 30.

The contents of the registration can be readily understood from the simultaneous display of all the possible choices for the registration during each timer setting operation.

Other objects, features and advantages of the invention will become apparent from the following description and claims taken in view of the drawings and which:

BRIEF DESCRIPTION OF THE DRAWINGS

FIGS. 4 through 16 are illustrations of the indicators of the timer setting apparatus according to the invention.

DESCRIPTION OF THE PREFERRED EMBODIMENT

A preferred embodiment of the present invention will be described hereinafter with reference to the accompanying drawings.

Figure 1:
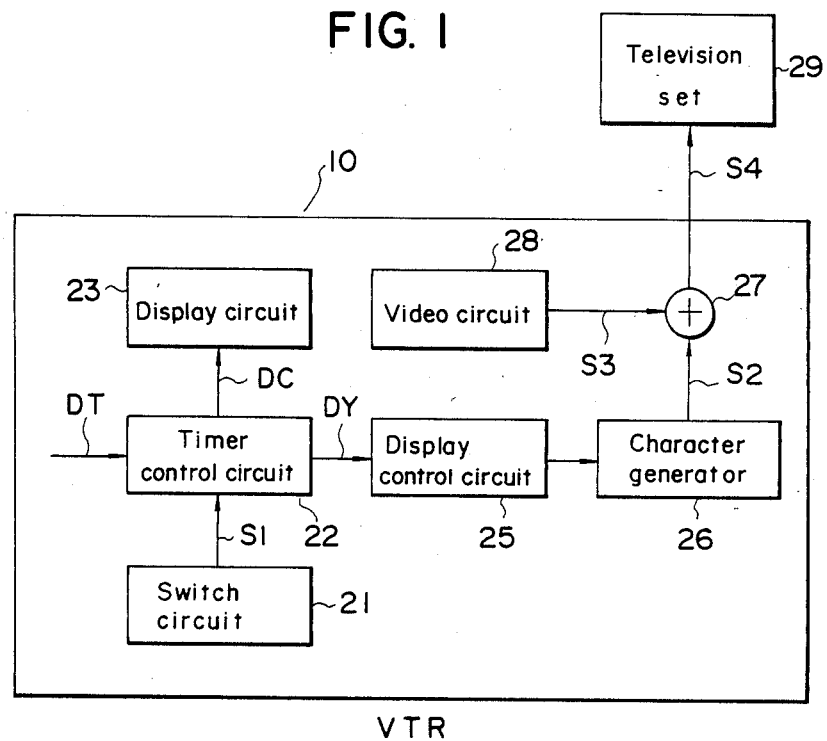
FIG. 1 is a block diagram of a VTR incorporating a timer setting apparatus according to the present invention.

Referring to FIG. 1, generally indicated at 10 is a VTR having a timer control circuit 22 which receives output signals S1 of a switch circuit 21 including a jog dial 12 and operating switches 13 to 20 (FIG. 2) which are produced according to timer setting operation.

Figure 2:
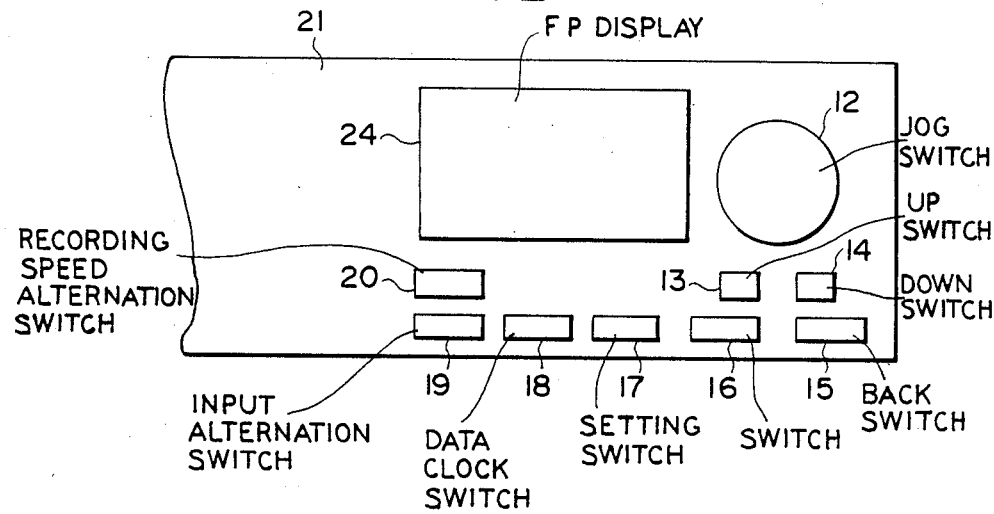
FIG. 2 is a schematic front elevation of the operating panel of the VTR in FIG. 1.

The timer control circuit 22 is a microcomputer which supplies timer setting information to a display circuit 23 so as to display the timer setting information on a FP display 24 (FIG. 2).

Timer Control Circuit:

The timer control circuit 22 has an internal memory capable of storing the data of starting date and time, recording input signals, or channels recording speed and end time, for example, for eight events. The timer control circuit 22 updates the data at the reception of every output signal S1 of the switch circuit 21 and receives a time signal DT representing the current date and time and upon the coincidence of the time signal DT with the starting date and time stored in the memory, the timer control circuit 22 actuates the VTR 10 for video recording operation. When the VTR is in an operating mode other than a timer setting mode, the timer control circuit displays time data, namely, the current date and time.

When the VTR 10 is in the timer setting mode, the timer control circuit 22 gives predetermined timer setting data display information DY to a display control circuit 25. Then, the display control circuit 25 drives a character generator 26 on the basis of the timer setting data display information DY to synthesize a timer setting data display signal S2.

An adder 27 receives the timer setting data display signal S2 and a video signal S4 provided by a video circuit 28, and then synthesizes a video display signal S4 for superimposing timer setting information represented by the timer setting data display signal S2 upon a picture represented by the video signal S3. The video display signal S4 is supplied to an external television set 29 connected to the VTR 10. Thus, the timer setting apparatus shown in FIG. 1 enables the confirmation of the timer setting operation on two displays, which are television set 29 and the FP display 24, when the VTR 10 is in the timer setting mode or in the data check mode.

Figure 3A:
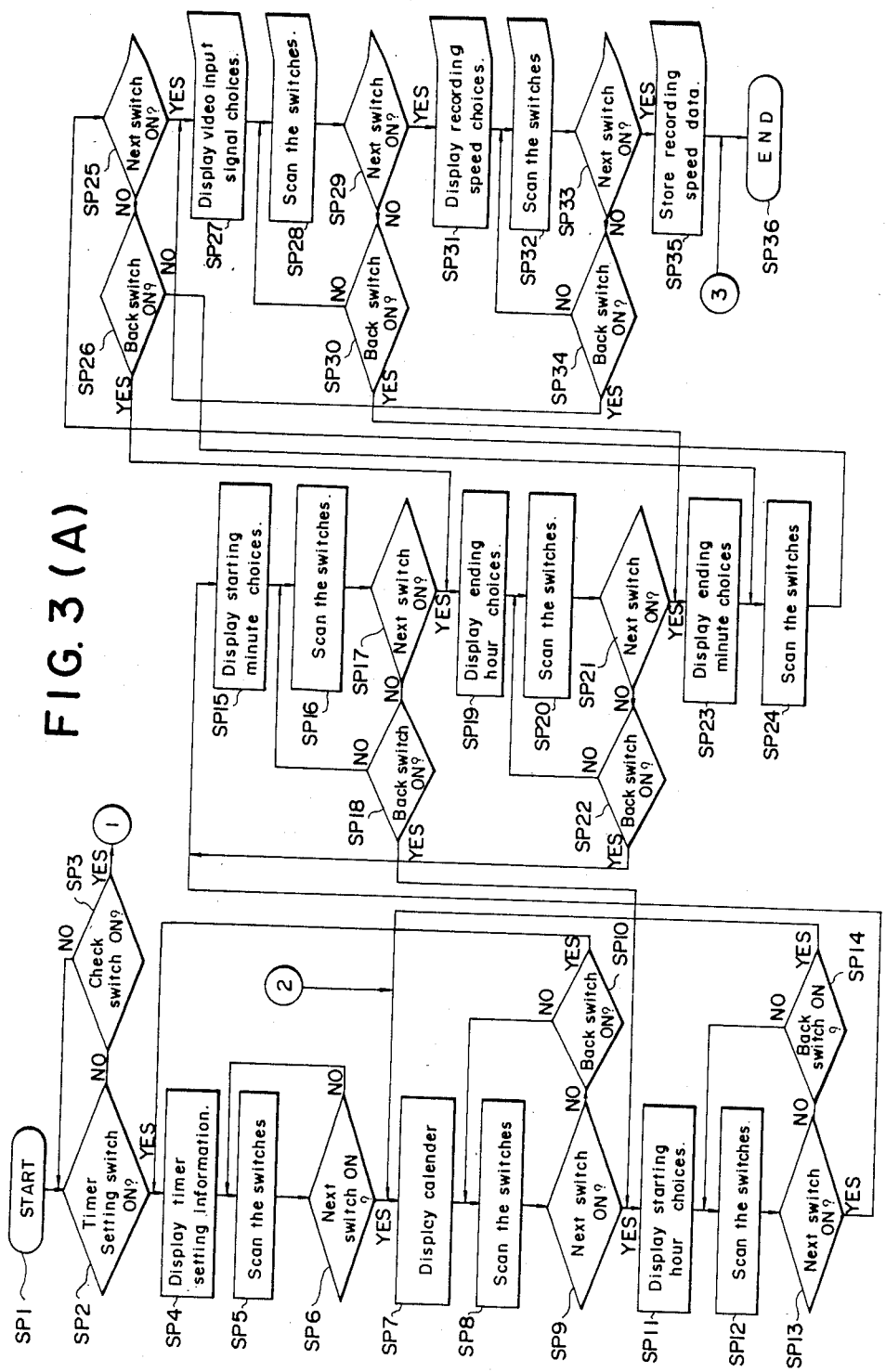
FIGS. 3A and 3B are flow diagrams so as to assist in explaining the procedures and operations of the timer setting operation.
Figure 3B:
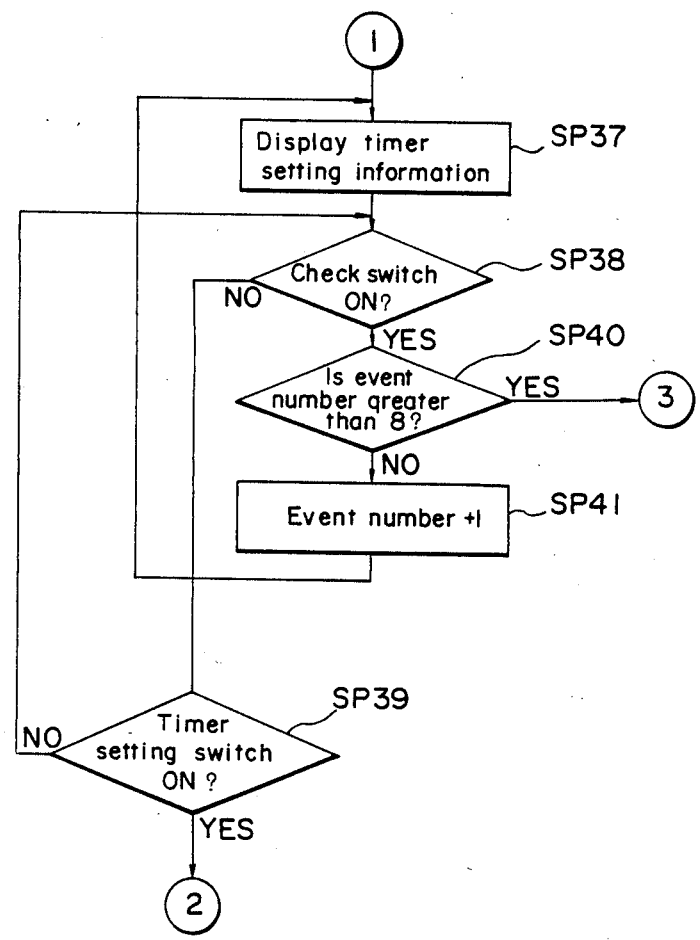

The timer control circuit 22 executes the control programs shown in FIGS. 3(A) and 3(B). The timer control circuit 22 scans a timer setting switch 17 and a data check switch 18. When the timer setting switch 17 or the data check switch 18 is turned ON, the timer setting mode or the data check mode is established. Then a decision is made at step SP2 as to whether or not the timer setting switch 17 is closed and, when the decision is NO, the routine goes to step SP3, where a decision is made as to whether or not the data check switch 18 is closed. When the decision at step SP3 is NO, the routine returns to step SP2 to repeat the determination of the status of the timer setting switch 17 again.

Figure 4:
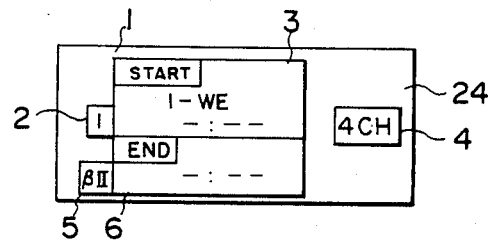

Timer Setting Mode:
For Event Setting:

When the timer setting switch 17 is closed, the decision at step SP2 is YES and the timer control circuit 22 is put in the timer setting mode, to execute step SP4. Then, the indication on the FP display 24 changes from the current date indication to th timer setting information indication to indicate set data DC for the first event stored in the memory of the timer control circuit 22. If a memory location for the first event is initialized, data representing the current set status of the VTR 10 as shown in FIG. 4 is displayed on the FP display 24. In such a case, a numeral "1" indicating the first event flashes in an even number display section 2, the day of the week of the setting day (in FIG. 4, "11-WE" indicating the Wednesday of the same week as that of the setting day is displayed on the upper line of a starting date and time display section 3, the starting time ("-:--") is displayed on the lower line of the starting date and time display section 3, channel ("4CH") indicating the channel 4 is displayed in a video signal input display section 4, a recording speed or mode ("BII") is displayed in a recording speed display section 5, and the ending time ("-:--") is displayed in an ending time display section 6.

Figure 5:
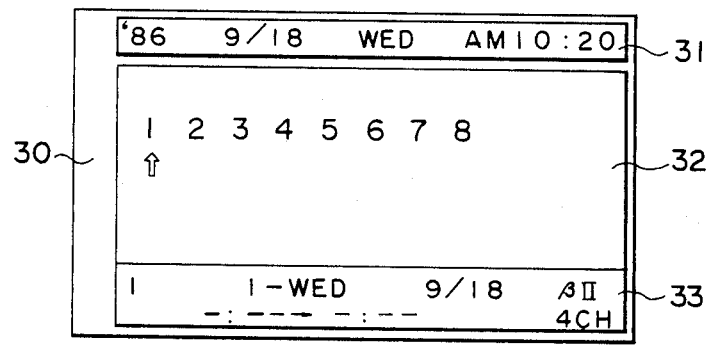

At the same time as shown in FIG. 5, the date, month, year, day of the week and time of the setting day are displayed in a setting day display section 31 in the upper section of the CRT screen 30 of the television set 29, for example, in a format: "'86 9/18 WED AM10:20" indicating Sept. 18, 1986, Wednesday, 10:20 a.m.

Numerals "1" to "8" representing the eight events, namely, the first event to the eighth event are displayed in a choice display section 32 below the setting day display section 31 with a cursor ( ) positioned below "1" indicating that the first event has been selected.

An indication indicating a recording date ("9/18" representing a setting day September 18 in this case because the memory is initialized) is displayed in addition to the indications displayed on the FP display 24 at a set data display section 33 for display the set data DC. The starting time and the ending time are displayed in a line with a mark " " therebetween ("-:-- -:--") below 1-WED.

At step SP5, the timer control circuit 22 scans the conditions of the jog dial control circuit 22, changes the indication displayed on the FP display 24 and the screen 30 of the television set 29 from the contents of the memory location for the first event to those of the memory location for the second event, and shifts the cursor from a position below "1" indicating the first event to a position below "2" indicating the second event, whereby the event indications on the FP display 24 and the screen 30 of the television set 29 are changed from "1" to "2".

After a predetermined time has passed, the timer control circuit 22 makes a decision at step SP6 as to whether or not a next switch 16 is ON and, when the decision is NO, the timer control circuit 22 executes step SP5 again to scan the switches. When the up switch 13 is ON continuously, the timer control circuit 22 changes the event indications of the set data DC from "2" for the second event to "3" for the third event, and then executes step SP6. Thus, the loop of steps SP5-SP6-SP5 is repeated to change the event indication sequentially from that for the first event to that for the eighth event and back again to that for the first event.

When the decision at step SP5 indicates that the down switch 14 is ON, the timer control circuit 22 changes the event indication downward from "3" for the third event, via "2" for the second event to "1" for the first event.

When the log dial is turned counterclockwise at step SP5, the timer control circuit 22 increases the event indication by one in a manner so that when the up switch 13 is ON, while the timer control circuit 22 decreases the event indication by one in a manner so that when the down switch 14 is ON when the log dial 12 is turned clockwise.

When the decision at step SP6 is YES designating the completion of the timer setting operation for a desired event and the start of the successive timer setting operation for another event, the timer control circuit 22 executes step SP7 to store the event number in a predetermined memory location (the first event in the case of FIG. 4) and to change the display data.

Figure 6:
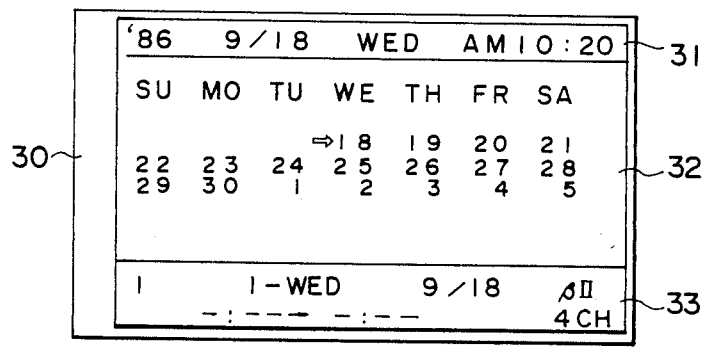
Figure 7:
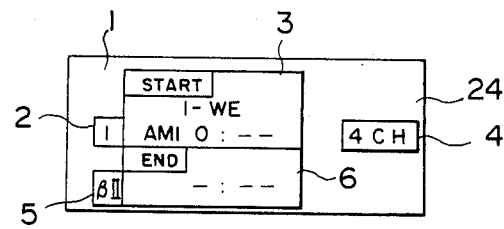
Figure 8:
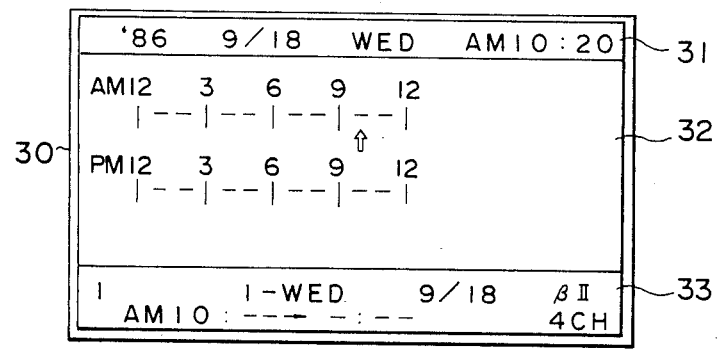

Recording Date Setting:

At step SP7, indications on the FP display 24 and on the television set 29 are changed simultaneously for indications of starting date, respectively. Among the setting data indications on the FP display 24 and on the television set 29, the event number indication "1" stops flashing and the day indication "1-WE" starts flashing. Indication in the choice display section 32 on the television set 29 changes from event indication to day and date indication as shown in FIG. 6, namely, "SU MO TU WE TH FR SA" and dates from the current date to a date corresponding to the Saturday of the week third from the current week. The days and dates are arranged in the form of a calendar. A cursor " " is located on the left-hand side of date "18" indicating September 18.

At step SP8, the up switch 13, the down switch 14 and the jog dial 12 are again scanned. When the up switch 13 is ON, the timer control ciruit 22 simultaneously shifts the cursor on the screen 30 of the television set 29 from the left-hand side of "18" to the left-hand side of "19" indicating September 19, changes the day indication on the FP display 24 from "WE" to "TH" indicating Thursday, and changes the indication in the set data display section 33 from "1-WED 9/18" to 1-THU 9-/19".

At step SP9, a decision is made as to whether or not the next switch 16 is ON.

When the decision at step SP9 is NO, the routine goes to step SP10, where a decision is made as to whether or not the back switch 15 is ON. When the decision at step SP10 is NO, the routine returns to step SP8 for scanning the switches 13 and 14, and the jog dial 12. When the up switch 13 is turned on again, the timer control circuit 22 shifts the cursor to the left-hand side of "20" indicating September 20 and changes the indication in the set data display section 33 of the screen 30 accordingly.

A loop of steps SP8-SP9-SP10-SP9 is repeated, and the cursor is shifted by a step and the date indication is changed by every turning on of the up switch 13. The cursor can be shifted up and the date indication can be changed by turning the job dial 12 counterclockwise instead of turning on the up switch 13. On the contrary, when the job dial 12 is turned clockwise or the down switch 14 is turned on, the cursor is shifted down and the date indication is changed accordingly.

When the decision at step SP10 is YES, namely, when the recording date setting operation is interrupted and the back switch 15 is turned on, the routine returns to step SP4 to execute the event number setting operation, and then the loop of steps SP5-SP6-SP5 is repeated to set and indicate a new event number.

When the decision at step SP9 is YES, namely, when the recording date pre-setting procedure is completed and the next switch 16 is turned on, the routine goes to step SP11 to store the starting date data in the memory location for the first event and to change the display data.

Start Hour Setting:

The timer control circuit 22 reads starting hour data from the memory location for the first event and changes the respective hour indications on the FP display 24 and in the set data display section 33 of the CRT screen 30 and then the day indication "1-WE" stops flashing and the hour indication "AMIO" starts flashing. Further, the indication in the choice display section 32 on the CRT screen 30 is changed from the calendar to an hour chart showing an upper hour scale graduated in an hour for the hours before noon, a lower hour scale graduated in an hour for the hours after noon (I--I--I--I--I--), hour indications for the upper hour scale (AM12 3 6 9 12) and hour indications for the lower hour scale (PM12 3 6 9 12). A cursor " " is located below a mark corresponding to the current hour of the setting date (in this case, below a mark next to an indication "9" on the upper hour scale, indicating 10 a.m. since the current hour is 10 o'clock in the morning).

Then, the timer control circuit 22 scans again the up switch 13, the down switch 14 and the job dial 12 at step SP12. When the jog dial 12 is turned counterclockwise or the up switch 13 is turned on, the cursor is shifted to the later hour and, when the jog dial 12 is turned clockwise or the down switch is turned on, the cursor is shifted to the earlier hour. The hour mark or the hour indication below which the cursor is located flashes.

At step SP13 a decision is made as to whether or not the next switch 16 is ON and the decision is made a to whether or not the back switch 15 is ON. When the decision at step SP14 is NO, the routine returns to step SP12 to repeat the scanning operation. Thus, the loop of steps SP12-SP13-SP14-SP12 is repeated to update the starting hour indication.

When the decision at step SP14 is YES, namely, when the starting hour setting operation is interrupted and the back switch 15 is turned on, the routine returns to step SP7 and the timer control circuit 22 becomes ready to start recording date setting operation.

When the decision at step SP13 is YES, namely, when the starting hour setting operation is completed and the next switch 16 is turned on, the routine goes to step SP15 to store the starting hour indicated by the cursor in the memory location of the first event.

Starting Minute Setting:

The timer control circuit 22 simultaneously reads minute data among the starting time stored in the memory location of the first event and indicates the minute data on the FP display 24 and on CRT screen 30 of the television set 29.

Figure 9:
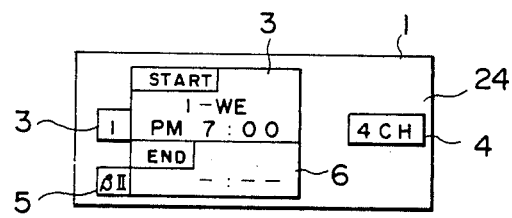
Figure 10:
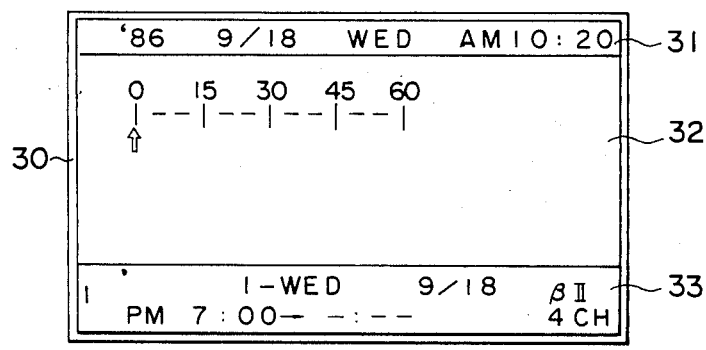

Referring to FIGS. 9 and 10, a minute indication (in this case ":00" because the memory is initialized) among the starting time of the first event is added to the indication, and then the time indication "PM 7" stops blinking or flashing and the minute indication ":00" starts blinking or flashing.

The indication in the choice display section 32 on the television set 29 is changed from the hour chart to a minute chart, which is similar to the hour chart, showing a minute scale graduated in five minutes. The minute scale is marked with minute indications "0 15 30 45 60", and a cursor " " is located below a minute indication indicating the minute of the current time.

At step SP16, the time control circuit 22 scans again the up switch 13, the down switch 14 and the jog dial 12. When the switches 13 and 14 and the jog dial 12 are operated, the cursor is shifted and minute indication corresponding to the status of the switches 13 and 14 and the jog dial 12 is displayed on the FP display 24 and in the set data display section 33 on the CRT screen 30 of the television set 29 accordingly.

At step SP17, a decision is made as to whether or not the next switch 16 is turned on. When the decision at step SP17 is NO, the routine goes to step SP18, where a decision is made as to whether or not the back switch 15 is ON. When the decision at step SP1B is NO, the routine returns to step SP16 for scanning the switches 13 and 14 and the jog dial 12.

Thus, the loop of steps SP16-SP17-SP18-SP16 is repeated to change the minute indication sequentially.

When the decision at step SP18 is YES, namely, when the starting minute setting operation is interrupted and the back switch 15 is turned on, the routine returns to step SP11 and the timer control circuit 22 becomes ready to start starting time setting operation.

When the decision at step SP17 is YES, namely, when the starting minute setting operation is completed and the next switch 16 is ON, the routine goes to step SP19 to store the minute indicated by the cursor as the minute data of the starting time in the memory location for the first event.

Ending Time Setting:

The timer control circuit 22 simultaneously reads ending time data from the memory location for the first event and displays the ending time data on the FP display 24 and in the set data display section 33 of the television set 29.

Figure 11:
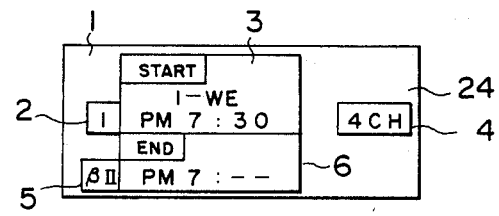
Figure 12:
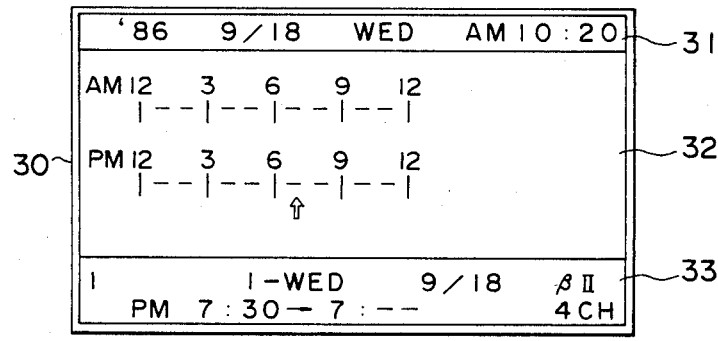

Referring to FIGS. 11 and 12, an hour indication representing the hour (in this case, "PM7" because the memory is initialized) among the first event ending time is added to the indications, the minute indication (":30") stops blinking or flashing and the hour indication starts blinking or flashing. The cursor is located below the hour set by the starting hour setting operation. Thus, the starting time setting operation is completed and the timer control circuit becomes ready to start ending hour setting operation.

At step SP20, the timer control circuit 22 scans the jog dial 12, the up switch 13 and the down switch 14, and thereby the location of the cursor is shifted and the hour indication of the ending time data in the set data display section is changed accordingly.

At step SP21, the timer control circuit 22 makes a decision as to whether or not the next switch 16 is ON. When the decision at step SP21 is NO, the routine goes to step SP22, where a decision is made as to whether or not the back switch 15 is ON. When the decision at step SP22 is NO, the routine returns to step SP20, where the timer control circuit 22 scans the jog dial 12 and the switches 13 and 14 again.

Thus, the loop of steps SP20-SP21-SP22-SP20 is repeated to change the ending hour indication.

When the decision at step SP22 is YES, namely, when the ending hour setting operation is interrupted and the back switch 15 is ON, the routine returns to step SP15 and the timer control circuit 22 becomes ready to start the starting minute setting operation for setting the minute data of a starting time.

When the decision at step SP21 is YES, namely, when the ending hour setting operation is completed and the next switch 16 is ON, the routine goes to step SP23 and the hour corresponding to the hour indication indicated by the cursor is stored as an ending hour in the memory location of the first event.

Ending Minute Setting:

The timer control circuit 22 simultaneously reads minute data among the ending time data from the memory location for the first event and displays the minute data on the FP display 24 and in the setting data display section of the television set 29.

Figure 13:
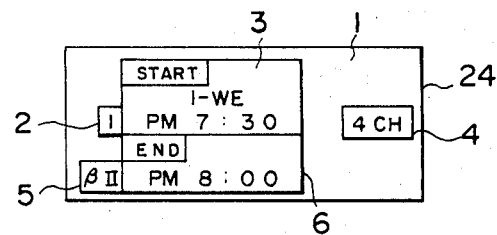
Figure 14:
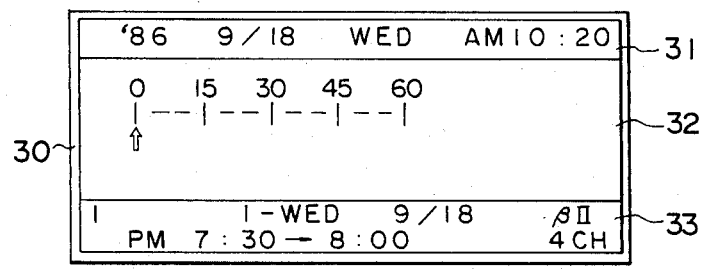

Referring to FIGS. 13 and 14, a minute indication (in this case ":00" because the memory is initialized) among the ending timer for the first event is added to the indications, the hour indication "PM 8" stops blinking or flashing and the minute indication starts blinking or flashing. The same time chart as that for starting minute setting is displayed in the choice display section 32 of the CRT screen 30.

Thus, the ending time setting operation is completed and the timer control circuit 22 becomes ready to start ending minute setting operation.

Then, the timer control circuit scans the jog dial 12, the up switch 13 and the down switch 14 at step SP24, and thereby the cursor is shifted and the ending minute indication is changed accordingly.

At step SP25, the timer control circuit 22 makes a decision as to whether or not the next switch is ON. When the decision at step SP25 is NO, the routine goes to step SP26, where a decision is made as to whether or not the back switch 15 is ON. When the decision at step SP25 is NO, the routine returns to step SP24 to scan the jog dial 12 and the switches 13 and 14.

Thus the loop of steps SP24-SP25-SP26-SP24 is repeated to change the ending minute indication.

When the decision at step SP26 is YES, namely, when the ending minute setting operation is interrupted and the back switch 15 is turned on, the routine returns to step SP19 and becomes ready to start the ending hour setting operation.

When the decision at step SP25 is YES, namely, when the ending minute setting operation is completed and the next switch 16 is ON, the routine goes to step SP27, where the minute data corresponding to a minute indication indicated by the cursor is stored as an ending minute data in the memory location for the first event.

Video Input Signal Setting:

The timer control circuit 22 simultaneously reads a video input signal from the memory location for the first event and displays the recording input signal as timer setting information on the FP display 24 and on the television set 29.

Figure 15:
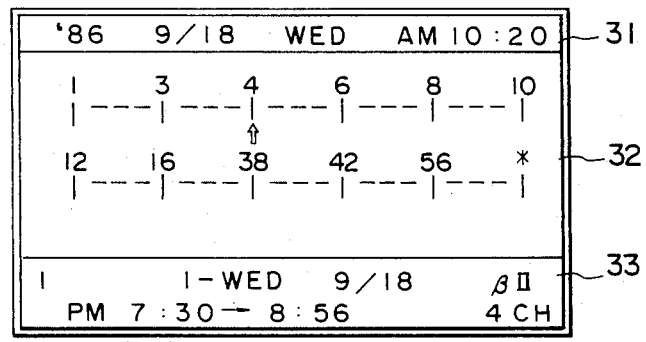

Referring to FIG. 15, an input signal indication for the first event (in this case, the input signal 4CH currently applied to the VTR because the memory is initialized) is added to the indications, the minute indication ":00" stops blinking or flashing and the video input signal indication "4CH" starts blinking or flashing. At the same time, broadcast receiving channels for which the tuner is present are displayed in a chart having two lines of bar scales similar to that of the time chart, and a cursor " " is located below the current video input channel. Thus, the ending minute setting operation is completed and the timer control circuit 22 becomes ready to start video input signal setting operation.

At step SP28, the timer control circuit 22 scans the input alteration switch 19, and thereby the cursor is shifted and the video input signal indication in the set data display section 33 is changed accordingly.

At step SP29, the timer control circuit 22 makes a decision as to whether or not the next switch 16 is ON. When the decision at step SP29 is NO, the routine goes to step SP30, where a decision is made as to whether or not the back switch 15 is ON. When the decision at step SP30 is NO, the routine returns to step SP28 to execute the scanning operation.

Thus, the loop of steps SP28-SP29-SP30-SP28 is repeated to change the video input signal indication sequentially.

When the decision at step SP30 is YES, namely, when the video input signal setting operation is interrupted and the back switch 15 is ON, the routine returns to step SP23 and the timer control circuit 22 becomes ready to start the ending minute setting operation.

When the decision at step SP29 is YES, namely when the video input signal setting operation is completed and the next switch 16 in ON, the routine goes to step SP31 and a broadcast receiving channel corresponding to a broadcast receiving channel indication indicated by the cursor is stored in the memory location for the first event.

Recording Speed Setting:

The timer control circuit 22 simultaneously reads recording speed data from the memory location for the first event and display the recording speed data on the FP display 24 and in the set data display section 33 of the television set 29.

Referring to FIGS. 13 and 15, a recording speed indication for the first event (in this case, a recording speed indication indicating the current speed of the VTR because the memory is initalized) starts blinking or flashing.

Thus, the video input signal setting operation is completed and the timer control circuit becomes ready to start the recording speed setting operation.

At step SP32, the timer control circuit 22 scans the recording speed alteration switch 20 and changes the recording speed indication accordingly.

At step SP33, the timer control circuit 22 makes a decision as to whether or not the next switch 16 is ON. When the decision at step SP33 is NO, the routine goes to step SP34, where a decision is made as to whether or not the back switch 15 is ON. When the decision at step SP34 is NO, the routine returns to step SP34 for scanning operation.

Thus, the loop of steps SP32-SP33-SP34-SP32 is repeated to change the recording speed indication sequentially.

When the decision at step SP34 is YES, namely, when the recording speed setting operation is interrupted and the back switch is ON, the routine returns to step SP27 and the timer Control circuit 22 becomes ready to start the ending minute setting operation again.

When the decision at step SP33 is YES, namely, when the recording speed setting operation is completed and the next switch 16 is ON, the routine goes to step SP38 and a recording speed corresponding to the recording speed indication is stored in the memory location for the first event, and then the routine goes to step SP36 to end the timer setting mode. Thus, the timer setting operation for the first event is completed.

Data Check Mode:

When the decision at step SP3 is YES, a data check mode is established and the timer control circuit 22 executes step SP37.

At step SP37, data for three events among the set data are read from the memory and are displayed on the television set 29 in a format as shown in FIG. 16, while the set data for the first event is displayed on the FP display 24. On the FP display 24, the event indication "1" indicating the first event blinks or flashes.

At step SP38, the timer control circuit 22 makes a decision as to whether or not the check switch 18 is ON. When the decision at step SP38 is NO, the routine goes to step SP39, where a decision is made as to whether or not the timer setting switch 17 is ON. When the decision at step SP39 is NO, the routine returns to step SP38, where a decision as to whether or not the check switch 18 is ON is made again.

When the decision at step SP38 is YES, namely, when the check switch 18 is ON, the routine goes to step SP40, where a decision is made as to whether or not the event number corresponding to the flickering event number indication is greater than eight. When the decision at step SP40 is NO, the routine goes to step SP41, where the timer control circuit 22 changes the data indication on the FP display 24 from the data indication for the first event to a data indication for the second event. At the same time, the event number indication on the television set 29 is changed from the event number indication "1" to an event number indication "2", and then the routine returns to step SP38.

Thus, the loop of steps SP37-SP38-SP40-SP41-SP37 is repeated to change the event number indication sequentially every closing operation of the check switch 18. When the check switch 18 is operated again at step SP37 after the event number indication has been changed to that for the third event or the sixth event, the timer control circuit 22 changes the next display on the television set 29 from the set data for the fourth event to that for the sixth event or from that for the seventh event to that for the eighth event.

When the decision at step SP40 is YES, namely, when the check switch 18 is operated for all the eight events, the routine jumps to step SP36 to end the timer setting check mode.

When the decision at step SP39 is YES, namely, when the timer setting switch 17 is ON to rewrite the set data for the desired event number after the desired event number has been displayed and flickered, the routine goes to step SP37 to execute the timer setting mode.

In operating the timer setting switch 17 is turned on to establish the timer setting mode, in which the decision at step SP2 is YES. Then, the jog dial 12, the up switch 13, the down switch 14, the next switch 16 and the back switch are operated sequentially and repeatedly to make the timer control circuit 22 execute steps SP3 to SP25 for storing starting time data and ending time data, and steps SP26 and SP36 to store necessary set data. During such operation, the set data is displayed sequentially on the FP display 24. while the set data and the possible choices are displayed simultaneously on the CRT screen 30 of the television set 29.

When the check switch 18 is turned on, the data check mode is established and the timer control circuit 22 executes the steps SP37 to SP41, in which the set data for the events are displayed sequentially on the FP display 24 and, at the same time, the set data for three events are displayed on the television set 29. When the timer setting switch 17 is turned on while the set data is displayed, the timer control circuit 22 executes the timer setting mode to store the set data for the desired event.

As is apparent from the foregoing description, according to the present invention, all the possible choices for setting each item to be registered are displayed in the choice display section 33 of the television set 29 for information to facilitate the timer setting operation. Accordingly, inadvertent erroneous timer setting operation is prevented.

Furthermore, in the preferred embodiment described herein, the set data is dispIaYed on both the television set 29 and the FP display 24 to improve the timer setting operation. AccordingIy, the timer setting operation is possible even when the VTR is not connected to the television set 29, because the set data is displayed on the FP display 24 of the VTR.

Although recording date is displayed on a calendar while the rest of the items are displayed in scales, namely, bar scales in the foregoing embodiment. The mode of display need not necessarily limited thereto and the items may be displayed in various suitable modes.

Furthermore, although the invention has been described as applied to a timer setting apparatus for a VTR, the present invention is not Iimited thereto in application, but may be applied to a timer setting apparatus for various electronic equipments.

Although the invention has been described in its preferred form with a certain degree of particularlity, it is to be understood to those skilled in the art that many changes and variations are possible in the invention without departing from the scope and spirit thereof.

I claim as my invention:

1. A timer setting apparatus for an electronic appliance comprising a manually controllable setting means which produces output signals necessary for timer setting and which has a first display means; timer control circuit means coupled to said manually controllable setting means for generating set data in response to said output signals and comprising a memory for storing set data, and capable of controlling said electronic appliance based on said data stored in said memory and a time signal representing the current time; and display control means coupled to said timer control circuit means and said manually controllable setting means for generating display images necessary for timer setting operation to be supplied to a cathode ray tube which comprises a second display means which is connected and including a character generator means, wherein said display control means generates a selecting table and a pointing cursor in said display images and said set data are selected by selecting the position of said pointing cursor on said selecting table with said manually controllable setting means and wherein first display illustrates the following information, the current date, the current time, the event to be recorded number, the week, the day of the week, the recording starting time and simultaneously the recording ending time and the channel and wherein said second display shows the date, month, day year, day of the week of the setting month, number of the event to be recorded with the recording date, month, day, starting time and ending time, the channel and the recording speed so that set data can be compared on said first and second display means.

2. Display apparatus as cited in claim 1, wherein said display means has a third display section where the current date and time are displayed.

3. A timer setting apparatus as recited in claim 1, wherein said display images are displayed is a blank area formed on the scree of a separate display means formed by superimposing the timer setting information signals on the video signals to be displayed on the screen of the display means.

4. A timer setting apparatus for an electronic appliance comprising; a manually controllable setting means which produces a set of output signals necessary for timer setting a broadcast program; timer control circuit means coupled to said manually controllable setting means for generating set data in response to said output signals and comprising a memory for storing set data, and capable of controlling said electronic appliance based on said set data stored in said memory and a time signal representing the current time; and display control means coupled to said timer control circuit means and said manually controllable setting means for sequentially generating a set of display images necessary for timer setting operation to be supplied to a cathode ray tube to which it is connected and including a character generator means, wherein said display control means generates sequentially different selecting tables corresponding to said set of output signal and a pointing cursor at a first position in said display images and said set data are sequentially selected in each of selecting tables by locating said pointing cursor on each of said respective selecting tables using said manually controllable setting means, and said display control means further generates a selected data table at a second position of said display image which includes selected data by said manually controllable setting means with said different selecting tables.

* * * * *